J. A. DOLE.
SCHOOL-DESK.
No. 171,272. Patented Dec. 21, 1875.
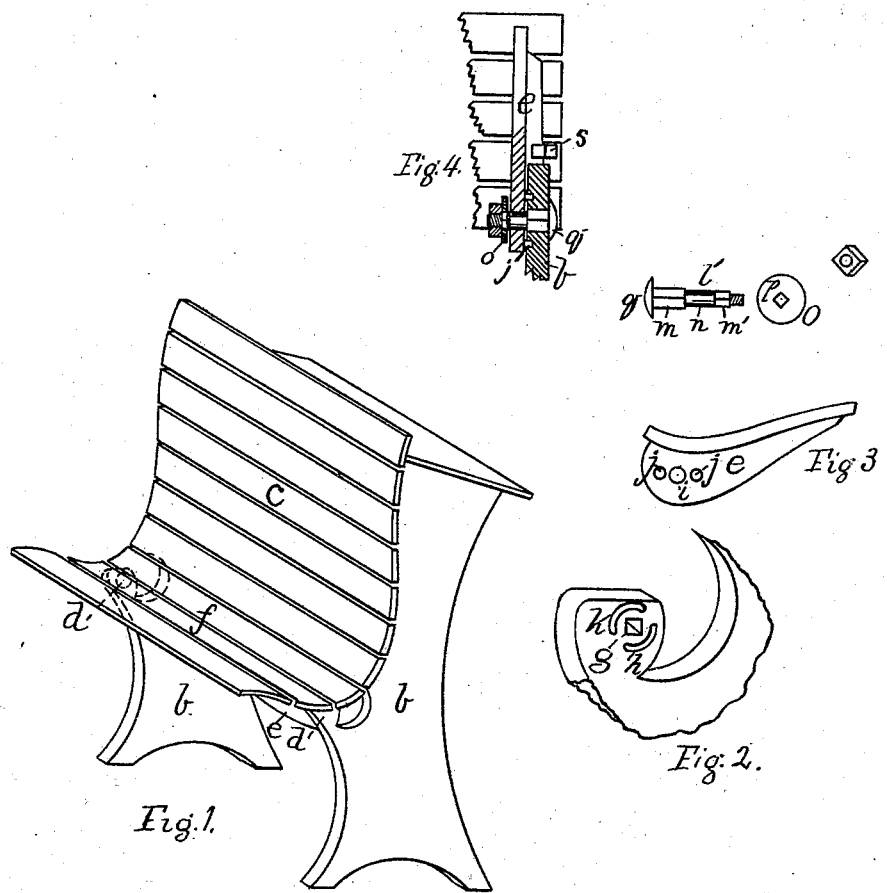

UNITED STATES PATENT OFFICE.

JAMES A. DOLE, OF BANGOR, MAINE.

IMPROVEMENT IN SCHOOL-DESKS.

Specification forming part of Letters Patent No. 171,272, dated December 21, 1875; application filed October 15, 1875.

*To all whom it may concern:*

Be it known that I, JAMES ALBERT DOLE, of Bangor, in the county of Penobscot and State of Maine, have invented certain new and useful Improvements in School Desks and Seats; and I do hereby declare that the following is a full, clear, and exact description thereof, that will enable others skilled in the art to which it appertains to make and use the same, reference being had to the accompanying drawings, forming a part of this specification, in which—

Figure 1 shows a perspective of a desk; Fig. 2, an inside view of one of the supports, showing hinge; Fig. 3, inside view of arm, showing hinge; Fig. 4, section of hinge with seat raised.

Same letters show like parts.

My invention relates to that class of school-desks which have a seat hinged to the front, so as to be capable of being turned up and out of the way when not in use; and consists of an improved hinge for attaching said seat, combining strength and lightness with freedom from noise.

As common, my desk is set upon supports (usually of metal) which form the legs and sides, and the seat is hinged to the front thereof.

My invention will be better understood by reference to the accompanying drawings, in which the desk is shown in Fig. 1, $b\ b$ being the sides or supports. At $c$ is shown the front of the desk, forming the back of the seat in front. To the supports $b\ b$, at $d$, is hinged the arm $e$. The construction of the hinge is best shown in Figs. 2 and 3.

Fig. 2 shows an inside view of one of the supports, having a square hole, $g$, therein, and provided with grooves $h\ h$, curved in the arc of a circle, having its center in the center of the hole $g$. Fig. 3 shows an inside view of the arm $e$, before referred to, which arm supports the seat $f$. This arm is provided with a circular hole, $i$, corresponding in position to the hole $g$ in the support, and also with lugs or teats $j\ j$, so formed as to work in the grooves $h\ h$.

The arm $e$ being placed in position on the inside of the support, the holes $g\ i$ corresponding with each other, and the lugs $j\ j$ fitting the grooves $h\ h$, a bolt, $l$, squared for a portion of its length, $m\ m'$, near its ends, and round in its center, $n$, is inserted in the holes $g\ i$, and a washer, $o$, having a square hole, $p$, in its center to fit the square end $m'$ of the bolt, is placed upon it, and secured either by heading up the bolt, or by a nut screwed thereon. The arm $e$ is held firmly to the standard $b$ between the bolt-head $q$ and washer $o$. Neither the bolt nor washer can turn, owing to the square form of the bolt; and the surfaces in contact with the arm are of considerable extent, enabling the movements of the arm and attached seat to be regulated by heading up the bolt, or screwing up the nut thereon, increasing the friction.

The arm turns upon the rounded portion of the bolt $n$, and the lugs $j\ j$ serve as stops, operating in the grooves $h\ h$, to check the arm either in a vertical or horizontal position.

These grooves being inclosed, the noise made by the lugs is deadened or muffled, while the double lugs $j\ j$ give a broad bearing to support the seat and take the weight off the bolt $l$, preventing wear upon it.

A strip of rubber, $s$, is attached to the wood-work of the seat $f$, so as to extend over the arm, and prevent contact between it and the support $b$, when the seat is down, in cases where the support extends beyond the hinge.

I do not claim the devices shown in the patents of W. B. Cogger, June 8, 1875, H. Ogborn, August 31, 1869, or George Sherwood, October 15, 1867. None of these shows the square bolt passing through a square hole in the standard, and into a square hole in the washer, and having a round bearing for the arm, which forms an important element in my combination; and it is only in combination with this element and with each other that I claim my devices.

What I claim as my invention, and desire to secure by Letters Patent, is—

The improved hinge for school desks and seats, formed by the supports $b\ b$, having the square hole $g$ and circular grooves $h\ h$ therein, in combination with the arm $e$, provided with the circular hole $i$ and the lugs $j\ j$, and the bolt $l$, having the square head and tip, and rounded center and washer $o$, all constructed and operating substantially as and for the purposes set forth.

In testimony that I claim the foregoing I have hereunto set my hand this 13th day of October, 1875.

JAMES ALBERT DOLE.

Witnesses:
JOHN R. MASON,
WM. FRANKLIN SEAVEY.